3,446,793
3'-CYCLIC ESTERS OF 5'-DEOXY-5'-(DIHYDROXY-PHOSPHINYLMETHYL)-NUCLEOSIDES
Gordon H. Jones and John G. Moffatt, Los Altos, Calif., assignors to Syntex Corporation, Panama, Panama, a corporation of Panama
No Drawing. Filed Oct. 30, 1967, Ser. No. 679,218
Int. Cl. C07f 9/10; A61k 27/00
U.S. Cl. 260—211.5
8 Claims

ABSTRACT OF THE DISCLOSURE

The 3'-cyclic esters of 5'-deoxy-5'-(dihydroxyphosphinylmethyl)-nucleosides are obtained by treatment of 5'-deoxy-5'-(diphenoxyphosphinylmethyl)-nucleosides with base. Alternatively, these cyclic esters can be prepared by reaction of 5'-deoxy-5'-(dihydroxyphosphinylmethyl)-nucleosides with dehydrating agents such as carbodiimides and the like. The cyclic 3',6'-phosphonates of the present invention are valuable pharmacological agents. For example, they exert control upon enzymes involved in glycogenesis.

The present invention relates to 3'-cyclic esters of 5'-deoxy-5'-(dihydroxyphosphinylmethyl)-nucleosides which can also be referred to as 6'-deoxyhomonucleoside-3',6'-cyclic phosphonates of the following formula:

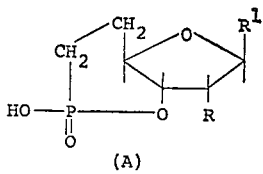

(A)

wherein,

R is hydrogen or hydroxy and the conventional hydrolyzable esters thereof;

$R^1$ is a pyrimidine or purine base and the conventional acyl derivatives thereof; and the pharmaceutically acceptable salts thereof.

The term "pyrimidine base," as used herein, means an unsubstituted or substituted pyrimidine or 6-azapyrimidine group wherein the point of attachment to the ribose unit is through the one position of the pyrimidine group. The term "purine base," as used herein, means an unsubstituted or substituted purine, 7-deazapurine or 8-azapurine group wherein the point of attachment to the ribose unit is through the nine position of the purine group. Thus, the term "pyrimidine or purine base" is inclusive of the nitrogen analogs, i.e. members of the 6-azapyrimidine, 7-deazapurine and 8-azapurine series.

An illustrative but by no means exhaustive listing of pyrimidine and purine bases includes: uracil-1-yl, cytosin-1-yl, 4-chloro-1,2-dihydropyrimidin-2-on-1-yl, 5-bromouracil-1-yl, 5-bromocytosin-1-yl, 5-chlorouracil-1-yl, 5-chlorocytosin-1-yl, 5-iodouracil-1-yl, 5-iodocytosin-1-yl, 5-fluorouracil-1-yl, 5-fluorocytosin-1-yl, thymin-1-yl, 5-methylcytosin-1-yl, 5-trifluoromethyluracil-1-yl, 5-trifluoromethylcytosin-1-yl, 5-aminouracil-1-yl, 5-aminocytosin-1-yl, 5-methylaminouracil-1-yl, 5-methylaminocytosin-1-yl, 5-hydroxyuracil-1-yl, 6-azauracil-1-yl, 6-azacytosin-1-yl, 4-chloro-6-aza-1,2-dihydro-pyrimidin-2-on-1-yl, 6-azathymin-1-yl, hypoxanthin-9-yl, 7-deazaadenin-9-yl, 7-deazaguanin-9-yl, adenin-9-yl, 6-dimethylaminopurin-1-yl, 6-chloropurin-9-yl, guanin-9-yl, xanthin-9-yl, 2,6-dichloropurin-9-yl, 2,6-bis(methylamino)purin-9-yl, 8-azaadenin-9-yl and 8-azaguanin-9-yl.

The terms "conventional hydrolyzable esters" and "conventional hydrolyzable acyl derivatives," as used herein and in the appended claims, refer to those esters and acyl derivatives having a hydrolyzable acyl group conventionally employed in the nucleoside art, preferably, those derived from hydrocarbon carboxylic acids of 1 to about 12 carbon atoms. Typical conventional hydrolyzable acyl groups thus include acetyl, propionyl, butyryl, valeryl, isovaleryl, hexanoyl, heptanoyl, octanoyl, nonanyl, decanyl, undecanoyl, lauroyl, benzoyl, phenylacetyl, phenylpropionyl, p-toluoyl, β-cyclopentylpropionyl, and the like.

The term "pharmaceutically acceptable salts," as used herein and in the appended claims, refers to those pharmaceutically acceptable salts conventionally employed in the nucleotide art such as the sodium, potassium, ammonium, trimethylammonium and triethylammonium salts.

The novel 3',6'-cyclic phosphonates of the present invention can be prepared according to the following illustrated processes:

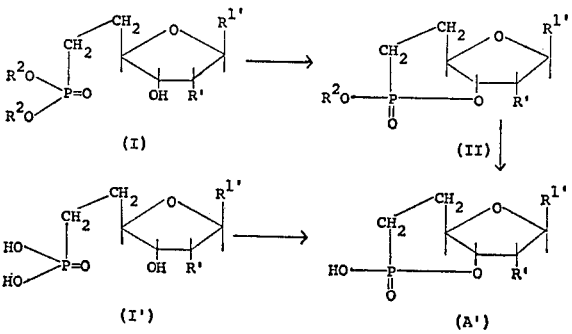

In the above formulas R' represents hydrogen or hydroxy, $R^{1'}$ represents a pyrimidine or purine base and $R^2$ represents an aryl group such as phenyl or substituted phenyl.

In the practice of the above process outlined as I→II→A', a diaryl-6'-phosphonate (I) is treated with base in an anhydrous organic solvent such as dimethylsulfoxide, dimethylformamide, and the like, at about room temperature to afford the aryl ester of the cyclic 3',6'-phosphonate (II). Suitable bases include the alkali t-alkoxides such as potassium t-butoxide, and the like. A compound of Formula II is then subjected to hydrolysis to afford a cyclic 3',6'-phosphonate (A'). The novel cyclic 3',6'-phosphonate (A') can also be produced by treating a 6'-phosphonic acid of formula I' with a dehydrating agent such as a carbodiimide in a basic solvent such as pyridine or the like. Suitable carbodiimides include N,N'-dicyclohexylcarbodiimide, N,N'-di-p-tolylcarbodiimide, and the like.

The hydrolyzable esters and acyl derivatives of formula A above can be obtained by acylating a compound of formula A' above with an acylating agent such as an acyl chloride or bromide or the acid anhydride of hydrocarbon carboxylic acids containing from 2 to 12 carbon atoms in an organic solvent such as pyridine, lutidine, and the like using conventional procedures. Acyl chlorides and bromides which can be used are acetyl chloride, acetyl bromide, benzoyl chloride, cyclohexanecarbonyl chloride, anisoyl chloride, ethylbenzoyl chlorides, methylbenzoyl bromides, β-cyclopentylpropionyl chloride, lauroyl chloride, decanoyl chloride, octanoyl bromide, and the like. Illustrative acid anhydrides include acetic anhydride, propionic anhydride, butyric anhydride, valeric anhydride, phenylacetic anhydride, phenylpropionic anhydride, hexanoic anhydride, and the like. The acylation reaction can be carried out, for example, in dry pyridine at about room temperature with stirring for a period of about 1 to 48 hours. The acylated product can be recovered by standard procedures such as pouring the reaction mixture into water, evaporating the solvent and purifying the remaining material by conventional means such as chromatography.

The novel cyclic 3',6'-phosphonates of the present invention of Formula A above are valuable pharmacological agents. Like adenosine 3',5'-cyclic phosphates, the novel isosteric cyclic 3',6'-phosphonates of Formula A above activate and exert control upon enzymes involved in glycogenesis. In addition, the compounds of the present invention mimic the action of certain hormones such as the luteinizing hormones and lead to increased cellular synthesis of glucocorticoids, progesterone and androgens. The novel cyclic 3',6'-phosphonates of Formula A, which can be used in the same manner as the known cyclic 3',5'-phosphates, are much less susceptible to hydrolysis by specific phosphodiesterases than are the cyclic 3',5'-phosphates and thus have a longer biological half life.

The starting materials of Formulas I and I' can be prepared according to the procedures of copending U.S. applications Ser. No. 643,078, filed June 2, 1967 and 654,056, filed July 18, 1967 by the reaction of a phosphorylated phosphoniumylid with a nucleoside 5'-aldehyde.

The following examples are provided to illustrate the present invention.

EXAMPLE 1

497 mg. (1 mmole) of 5'-deoxy-5'-(diphenoxyphosphinylmethyl)-adenosine (also referred to as diphenyl[9-(5,6 - dideoxy-β-D-ribo-hexofuranosyl)-adenine]-6'-phosphonate) is dissolved in 5 ml. of anhydrous dimethylsulfoxide and treated at 20° C. with a solution of 117 mg. of freshly sublimed potassium t-butoxide in 5 ml. of dimethylsulfoxide. The reaction mixture is kept at 20° C. for two hours and then 40 ml. of water is added. After 10 minutes, the pH of the resulting solution is brought to 7 by the addition of Dowex 50 (acid ion-exchange resin of styrene-divinylbenzene copolymer) which is then removed by filtration. The filtrate is concentrated to afford the 3'-cyclic ester of 5'-deoxy-5'-(dihydroxyphosphinylmethyl)-adenosine. For purification, if desired, the foregoing filtrate is applied to a diethylaminoethyl cellulose column (35 cm. x 3 cm.) in the bicarbonate form. Elution of the column is carried out using a linear salt gradient, with two liters of 0.002 M triethylammonium bicarbonate pH 7.5 in the mixing chamber and two liters of 0.1 M triethylammonium bicarbonate in the reservoir. The elution of the products is followed spectrophotocarbonally at 256 mµ. The fractions containing the main ultraviolet absorbing peak are pooled and concentrated to dryness. The residue is redissolved in water and lyophilized to yield the triethylammonium salt of the 3'-cyclic ester of 5'-deoxy-5'-(dihydroxyphosphinylmethyl)-adenosine which can be converted into other salts by conventional techniques.

EXAMPLE 2

The pyridinium salt of 345 mg. (1 mmole) of 5'-deoxy-5'-(dihydroxyphosphinylmethyl)-adenosine is dissolved in 25 ml. of dry pyridine and 293 mg. (1 mmole) of 4-morpholine-N,N'-dicyclohexylcarboxamidine is added. The final traces of moisture are removed by evaporation of the solution to dryness (repeated three times) and the final residue is dissolved in 100 ml. of dry pyridine. This solution is added slowly over two hours into a boiling solution of 1.03 g. (5 mmoles) of dicyclohexylcarbodiimide in 100 ml. dry pyridine. After removal of the pyridine by evaporation under reduced pressure, the product is partitioned between 50 ml. of water and 50 ml. of ether. The water-ether mixture is filtered to remove dicyclohexylurea and the aqueous layer is chromatographed on a diethylaminoethyl cellulose column as described in Example 1 to afford the triethylammonium salt of the 3'-cyclic ester of 5'-deoxy-5'-(dihydroxyphosphinylmethyl)-adenosine which can be converted into the free acid by passage through a column of free acid ion-exchange resin, if desired.

EXAMPLE 3

A mixture containing 0.5 g. of the triethylammonium salt of the 3'-cyclic ester of 5'-deoxy-5'-(dihydroxyphosphinylmethyl)-adenosine, 25 ml. of pyridine and 12 ml. of butyric anhydride is refluxed a few minutes until a solution is obtained. The solution is then cooled and allowed to stand at room temperature for about five days. Thereafter, the reaction mixture is diluted with water and evaporated to dryness. The residue is chromatographed on a column containing Dowex 1 (a trimethylbenzylammonium derivatives of styrene-divinylbenzene copolymer) in the bicarbonate form eluting with 0.1 N triethylammonium bicarbonate to give one principle ultraviolet absorbing peak which is evaporated to dryness and freed from residual bicarbonate by repeated evaporation with methanol to give the triethylammonium salt of the 3'-cyclic ester of 5'-deoxy-5'-(dihydroxyphosphinylmethyl)-$N^6$,2'-O-dibutyryl-adenosine which can be converted into other salts or the free acid by conventional techniques.

EXAMPLE 4

The process of Example 1 is repeated using as the starting material 5'deoxy - 5' - (diphenoxyphosphinylmethyl)-cytidine.

5'-deoxy-5'-(diphenoxyphosphinylmethyl-uridine,
5'-deoxy-5'-(diphenoxyphosphinylmethyl)-inosine,
5'-deoxy-5'-(diphenoxyphosphinylmethyl)-guanosine,
5' - deoxy-5'-(diphenoxyphosphinylmethyl)-thymidine, and there is obtained:

The 3'-cyclic ester of 5'-deoxy-5'-(dihydroxyphosphinylmethyl)-cytidine,
The 3'-cyclic ester of 5'-deoxy-5'-(dihydroxyphosphinylmethyl)-uridine,
The 3'-cyclic ester of 5'-deoxy-5'-(dihydroxyphosphinylmethyl)-inosine,
The 3'-cyclic ester of 5'-deoxy-5'-(dihydroxyphosphinylmethyl)-guanosine, and
The 3'-cyclic ester of 5'-deoxy-5'-(dihydroxyphosphinylmethyl)-thymidine, and the triethylammonium salts thereof, respectively.

EXAMPLE 5

An aqueous methanol solution of the triethylammonium salt of the 3'-cyclic ester of 5'-deoxy-5'-(dihydroxyphosphinylmethyl)-adenosine is passed through a column of free acid ion-exchange resin and the eluate adjusted to a pH of about 4.5 by the dropwise addition of aqueous sodium hydroxide solution. The eluate is then concentrated and lyophilized to afford the sodium salt of the 3'-cyclic ester of 5' - deoxy - 5' - (dihydroxyphosphinylmethyl)-adenosine.

What is claimed is:
1. A compound selected from those of the formula

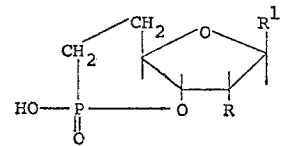

wherein,

R is hydrogen or hydroxy and the conventional hydrolyzable esters thereof;

$R^1$ is a pyrimidine or purine base selected from the group consisting of uracil-1-yl, cytosin-1-yl, 4-chloro-1,2-dihydropyrimidin-2-on-1-yl, 5-bromouracil-1-yl, 5-bromocytosin-1-yl, 5-chlorouracil-1-yl, 5-chlorocytosin-1-yl, 5-iodouracil-1-yl, 5-iodocytosin-1-yl, 5-fluorouracil-1-yl, 5-fluorocytosin-1-yl, thymin-1-yl, 5-methylcytosin-1-yl, 5-trifluoromethyl-uracil-1-yl, 5-trifluoromethylcytosin-1-yl, 5-aminouracil-1-yl, 5-aminocytosin-1-yl, 5-methylaminouracil-1-yl, 5-methylaminocytosin-1-yl, 5-hydroxyuracil-1-yl, 6-azauracil-1-yl, 6-azocytosin-1-yl, 4-chloro-6-aza-1,2-dihydropyrimidin-2-on-1-yl, 6-azathymin-1-yl, hypoxanthin-9-yl, adenin-9-yl, 7-deazaadenin-9-yl, 7-deazaguanin-9-yl, 6-dimethylaminopurin-1-yl, 6-chloropurin-9-yl, guanin-9-yl, xanthin-9-yl, 2,6-dichloropurin-9-yl, 2,6-bis(methylamino)purin-9-yl, 8-azaadenin-9-yl, and 8-azaguanin-9-yl, and the conventional hydrolyzable acyl derivatives thereof; and the pharmaceutically acceptable salts thereof.

2. A compound according to claim 1 wherein R is hydrogen or hydroxy.

3. A compound according to claim 2 wherein $R^1$ is adenin-9-yl.

4. A compound according to claim 2 wherein $R^1$ is uracil-1-yl.

5. A compound according to claim 2 wherein $R^1$ is cytosin-1-yl.

6. A compound according to claim 2 wherein $R^1$ is thymin-1-yl.

7. A compound according to claim 2 wherein $R^1$ is guanin-9-yl.

8. A compound according to claim 1 wherein R is hydrogen and $R^1$ is adenin-9-yl.

References Cited
UNITED STATES PATENTS 3,300,479    1/1967    Hanze _____ 260—211.5
3,337,530    8/1967    Hanze.

LEWIS GOTTS, *Primary Examiner.*

J. R. BROWN, *Assistant Examiner.*

U.S. Cl. X.R.

424—180, 200